US006870685B2

(12) United States Patent
Hong et al.

(10) Patent No.: US 6,870,685 B2
(45) Date of Patent: Mar. 22, 2005

(54) COLOR SEPARATING DEVICE USING DICHROIC MIRROR WHEEL AND IMAGE PROJECTING APPARATUS USING THE SAME

(75) Inventors: Chang-wan Hong, Suwon (KR); Sang-whoe Dho, Suwon (KR)

(73) Assignee: Samsung Electronics Co., Ltd., Gyunggi-Do (KR)

( * ) Notice: Subject to any disclaimer, the term of this patent is extended or adjusted under 35 U.S.C. 154(b) by 0 days.

(21) Appl. No.: 10/615,774

(22) Filed: Jul. 10, 2003

(65) Prior Publication Data

US 2004/0105162 A1 Jun. 3, 2004

(30) Foreign Application Priority Data

Jul. 10, 2002 (KR) ................................ 10-2002-0040101

(51) Int. Cl.[7] .............................................. G02B 27/14
(52) U.S. Cl. ...................................................... 359/634
(58) Field of Search ................................ 359/629, 634, 359/196, 197, 206, 216, 226; 348/270, 742, 743; 353/31

(56) References Cited

U.S. PATENT DOCUMENTS 6,266,105 B1    7/2001   Gleckman
6,334,685 B1 *  1/2002   Slobodin ..................... 353/31

FOREIGN PATENT DOCUMENTS

DE       44 34 649 A1     4/1996
WO       WO 01/72049 A2   9/2001
WO       WO 01/92946 A1   12/2001

OTHER PUBLICATIONS

Japanese Abstract No. 2000171898, dated Jun. 23, 2000.

* cited by examiner

Primary Examiner—Hung Xuan Dang
Assistant Examiner—Joseph Martinez
(74) Attorney, Agent, or Firm—Sughrue Mion, PLLC

(57) ABSTRACT

An image projecting apparatus including a light source that emits a plurality of monochromatic lights of different wavelength, a condenser lens that concentrates the plurality of monochromatic lights, a color separating device that has a plurality of dichroic mirrors which while rotating selectively reflect or transmit the plurality of incident monochromatic lights. A square beam generator receives the input of two reflected monochromatic lights from the color separating device almost simultaneously, thereby forming two square beams. A panel unit receives the two square beams generated, thereby forming respectively corresponding monochromatic color stripes thereon. By selectively reflecting or transmitting the plurality of incident monochromatic lights with the plurality of dichroic mirror wheels, light utilization at a panel increases. Further, since the two different monochromatic color stripes are simultaneously formed on the panel unit, partial overlapping of the monochromatic color stripes on the panel unit is prevented.

9 Claims, 9 Drawing Sheets

COLOR SEPARATING DEVICE USING DICHROIC MIRROR WHEEL AND IMAGE PROJECTING APPARATUS USING THE SAME

BACKGROUND OF THE INVENTION

The present Application claims priority from Korean Patent Application Number 10-2002-0040101 filed in the Republic of Korea on Jul. 19, 2002, which Korean application is incorporated in full herein by reference.

1. Field of the Invention

The present invention generally relates to a color separating device and an image projecting apparatus using the same, and more particularly, it relates to a color separating device using a dichroic mirror wheel capable of minimizing light loss by using a plurality of dichroic mirror wheels, and an image projecting apparatus using the color separating device.

2. Description of the Related Art

Apparatuses like projectors and projection systems display a predetermined image on a screen by projecting a light generated at a light source onto the screen through an optical system. Such displays are used in many places, namely, in meetings for presentation, and in theaters and homes.

Recently, optical devices such as projectors or projection systems have usually been provided with a digital micromirror device (DMD), providing far clearer images than do liquid crystal displays (LCD) or cathode ray tubes (CRT).

The DMD has a number of micromirrors corresponding to the given resolution. The micromirrors control light reflection in accordance with the input signals. Briefly put, the DMD is a semiconductor optical switch using a set of micro-mirrors. Since the DMD seldom has light loss, it has an excellent color representation and brightness.

Figure 1:
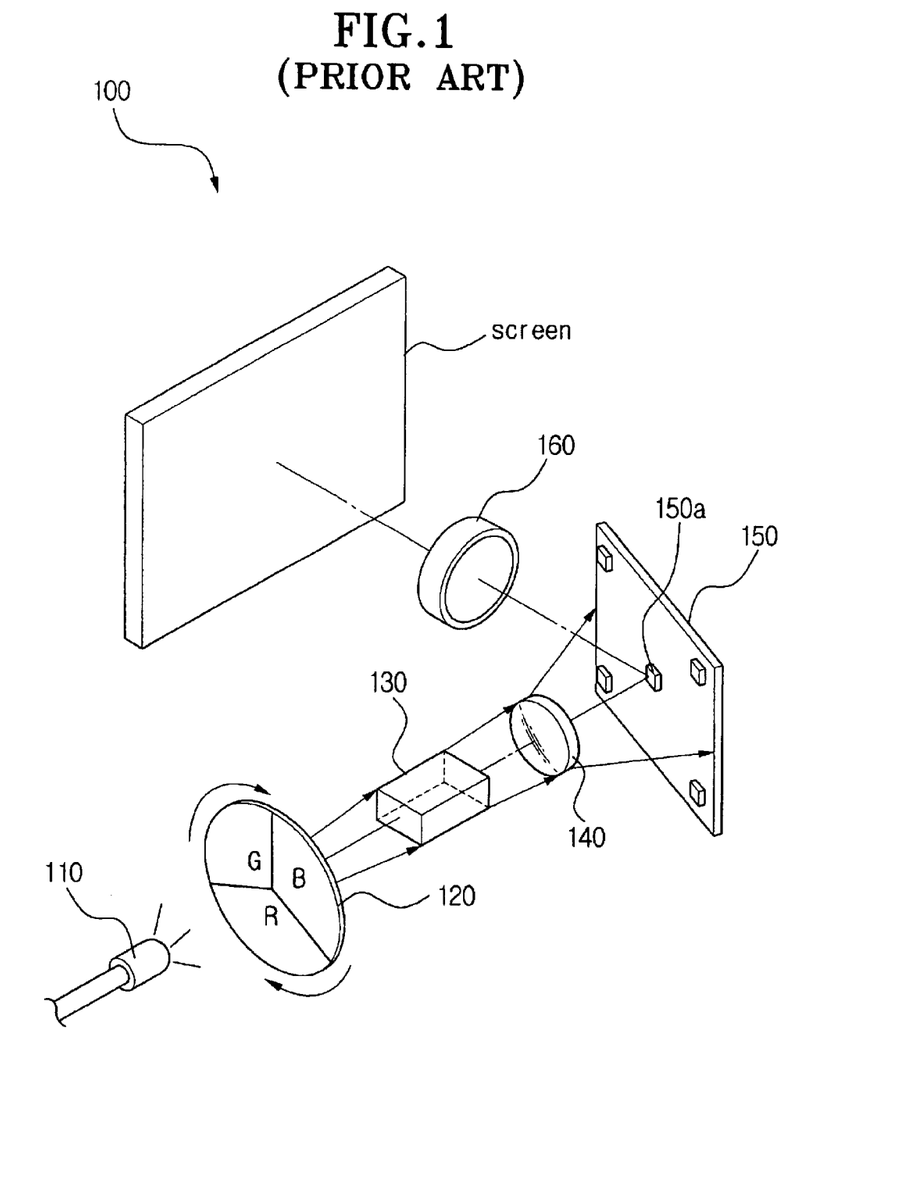
FIG. 1 is a view showing a conventional image projecting apparatus using a color filter wheel.

FIG. 1 is a view showing the basic structure of a conventional image projection apparatus using a color filter wheel.

Referring to FIG. 1, the conventional image projection apparatus 100 using the color filter wheel includes a light source 110, a color filter wheel 120, a light tube 130, a lens 140, a DMD panel 150 and a projection lens 160. The one-dotted line in FIG. 1 represents an optic path of white light.

The light source 110 emits a white light, and can be an arc lamp or a laser. The color wheel 120 is rotated in the arrowed direction by a rotating means (not shown), and divided into a red (R), green (G) and blue (B) divisions. The white light emitted from the light source 110 is transmitted through the R, G and B divisions and split into rays of light, i.e., R, G and B beams.

The light tube 130 is formed as a hollow hexahedron having a through hole penetrating therein. The R, G and B beams from the color wheel 120 are transformed into a square beam inside of the light tube 130. The square beam of the laser beam is dispersed at the lens 140 to be incident on the DMD panel 150.

The DMD panel 150 includes a plurality of micromirrors 150a. The R, G and B beams of respective wavelength form corresponding monochromatic color stripes on the DMD panel 150 by order of incidence, and are reflected from the micromirrors 150a of the DMD panel 150. The reflected R, G and B beams transmit through the projection lens 160 and form an image on the screen.

The image projection apparatus 100 described above can fast-process in response to the split R, G and B beams by the independently-driven micromirrors 150a. In other words, good quality color image can be obtained with simple structure. However, in the case of using a color filter, only a third of the light quantity from the light source is incident on the DMD panel 150.

This is because 60–70% of the white light emitted from the light source is blocked at the color wheel 120. While the R beam is evenly projected on the entire panel, other beams, i.e., G and B are completely blocked by the color filter and discarded. The same situation also applies with respect to the G and B beams. Accordingly, since only a third of the incident white light is utilized according to the color filter method, the light utilization decreases.

SUMMARY OF THE INVENTION

Accordingly, it is one aspect of the present invention to provide a color separating device capable of improving utilization of light by using a dichroic mirror wheel and an image projecting apparatus using the color separating device.

It is another aspect of the present invention to provide a color separating device, which uses a plurality of dichroic mirror wheels to eliminate overlapping of monochromatic color stripes while a plurality of monochromatic color stripes are simultaneously formed on a single-plate type panel, and an image projecting apparatus using the color separating device.

According to the present invention, in an image projecting apparatus having a color separating device for separating a light emitted from a light source into a plurality of monochromatic lights of different wavelength, and a panel unit for receiving an input of the monochromatic lights reflected from the color separating device and forming on a screen as corresponding monochromatic color stripes, the color separating device includes a first reflective wheel unit comprising a plurality of color separating reflective wheels which are arranged with respect to a rotary shaft in a circumferential direction at equal intervals for selectively reflecting or transmitting the plurality of incident monochromatic lights of the light from the light source, a second reflective wheel unit comprising a plurality of color separating reflective wheels which are arranged with respect to the rotary shaft in a circumferential direction at equal intervals for selectively reflecting or transmitting the plurality of incident monochromatic lights of the light from the light source which are not transmitted through the first reflective wheel unit, the plurality of color separating reflective wheels being at a predetermined distance from the first reflective wheel unit in a lengthwise direction of the rotary shaft, a third reflective wheel unit comprising a plurality of color separating reflective wheels which are arranged in the circumferential direction of the rotary shaft facing the plurality of color separating reflective wheels of the first reflective wheel unit so as to selectively reflect or transmit the plurality of incident monochromatic lights of the light which is transmitted through the first reflective wheel unit, the plurality of color separating reflective wheels being at a predetermined distance from the second reflective wheel unit in a lengthwise direction of the rotary shaft, and a fourth reflective wheel unit comprising a plurality of color separating reflective wheels which are arranged in the circumferential direction of the rotary shaft facing the plurality of color separating reflective wheels of the second reflective wheel unit so as to selectively reflect or transmit the plurality of incident monochromatic lights of the light which is transmitted through the second reflective wheel unit, the plurality of color separating reflective wheels being at a predetermined distance from the third reflective wheel unit in a lengthwise direction of the rotary shaft.

The color separating reflective wheels of the first to fourth reflective wheel units are arranged with respect to the rotary shaft in the circumferential direction at an interval of 60°.

Further provided are a condenser lens for concentrating the light emitted from the light source onto the color separating reflective wheels of the color separating device, a first collimating lens for concentrating the monochromatic light which is reflected from the color separating reflective wheels of the color separating device to be incident on the first collimating lens, a plurality of square beam generating units for transforming the monochromatic light from the first collimating lens into a square beam and then outputting the square beam, a second collimating lens for concentrating the square beam from a plurality of square beam generating units onto a corresponding position of the panel unit, and a projecting lens for enlarging the monochromatic color stripes from the panel unit and then projecting the enlarged monochromatic color stripes onto the screen.

According to the present invention, by selectively reflecting and transmitting R, G, B monochromatic lights using a plurality of dichroic mirrors based on the respective wavelengths, light utilization with respect to the panel increases. Also, overlapping of the monochromatic color stripes on the panel can be prevented.

BRIEF DESCRIPTION OF THE DRAWINGS

The above objects and other features of the present invention will become more apparent by describing in detail a preferred embodiment thereof with reference to the attached drawings, in which.

DETAILED DESCRIPTION OF THE PREFERRED EMBODIMENT

Hereinafter, the present invention will be described in detail with reference to the accompanying drawings.

Figure 2:
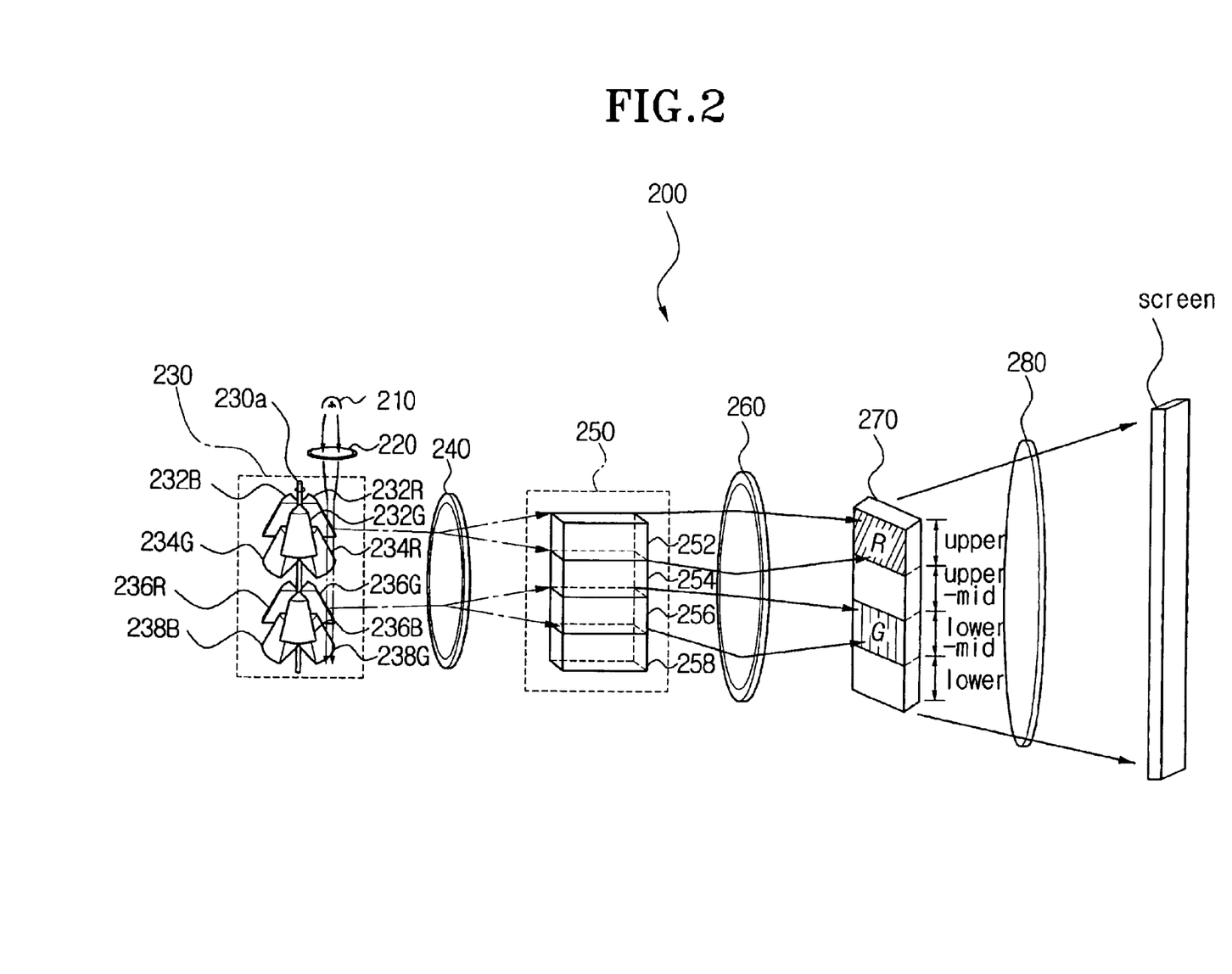
FIG. 2 is a view showing an image projecting apparatus according to a preferred embodiment of the present invention.

FIG. 2 is a view showing the basic structure of an image projecting apparatus according to a preferred embodiment of the present invention.

Referring to FIG. 2, the image projecting apparatus 200 according to the present invention includes a light source 210, a condenser lens 220, a color separating device 230, a first collimating lens 240, a square beam generating units 250, a second collimating lens 260, a panel unit 270, and a projection lens 280.

In FIG. 2, a path of travel of the light reflected from the color separating device 230 is represented by a one-dotted line, while a path of travel of the light transmitted through the color separating device 230 is represented by a double-line.

The light source 210 emits white light. The white light consists of a plurality of monochromatic lights of different wavelengths. The plurality of monochromatic lights includes red (R), green (G), and blue (B) laser beams. The light source 210 may be formed as a laser, an arc lamp, a metal halide lamp, a halogen lamp or a xenon lamp.

The condenser lens 220 concentrates on the color separating device 230 the R, G and B laser beams that are emitted from the light source 210. Preferably, a collimating lens is used for the condenser lens 220.

Figure 3:
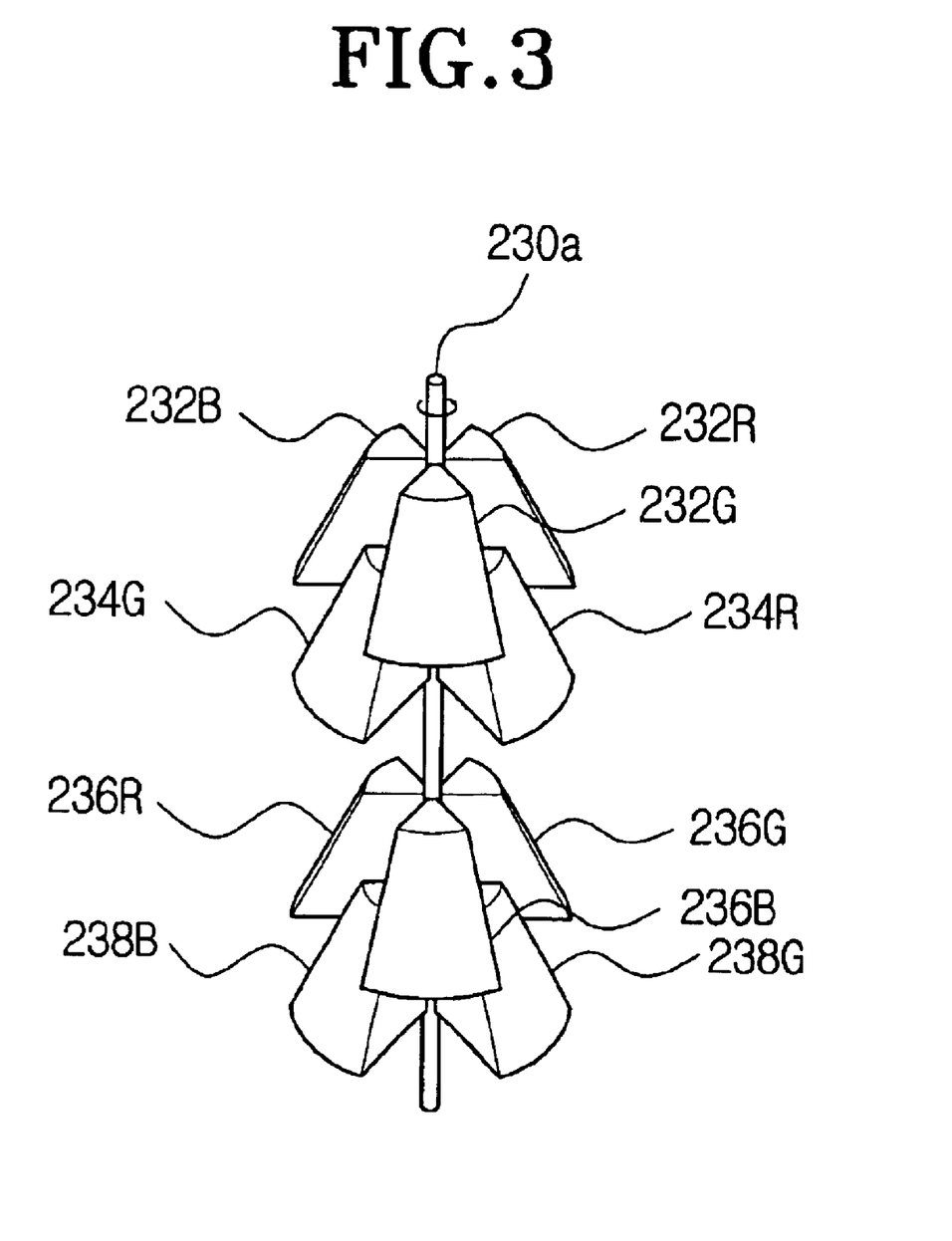
FIG. 3 is a perspective view of the color separating device of FIG. 2.

FIG. 3 is a perspective view of the color separating device of FIG. 2, and FIGS. 4A to 4D are sectional views of first to fourth reflective wheel units that have dichroic mirrors according to the present invention.

The color separating device 230 splits the white light from the condenser lens 220 into a plurality of monochromatic lights of different wavelengths. The color separating device 230 includes a plurality of reflective wheel units at a rotary shaft 230a. The rotary shaft 230a is rotated by a driving device such as a motor (not shown) in the arrowed, or reverse-arrowed direction in FIG. 2.

Referring to FIG. 3, and additionally to FIGS. 4A to 4D, the color separating device 230 according to the present invention includes first to fourth color separating units 232, 234, 236, 238 arranged along the rotary shaft 230a at predetermined intervals from each other in a zigzag fashion.

Further, first to fourth reflective wheel units 232, 234, 236, 238 are arranged at predetermined slopes with respect to the rotary shaft 230a. The predetermined slopes determine the direction of reflection and transmission of the monochromatic color light at the first to fourth reflective wheel units 232, 234, 236, 238.

More specifically, it is preferred that the first and the third reflective wheel units 232 and 236 and the second and the fourth reflective wheel units 234 and 238 are formed at respective slopes so that the reflected monochromatic lights are incident onto the square beam generating unit 250.

Further, first to fourth color separating units 232, 234, 236, 238 are provided with a plurality of color separating reflective wheels 232R, 232G, 232B, 234R, 234G, 234B, 236R, 236G, 236G, 238R, 238G, 238B (hereinafter briefly referred as "232R to 238B") which are arranged along the circumferential direction with respect to the rotary shaft 230a at equal intervals within each color separating unit.

The plurality of color separating reflective wheels 232R to 238B use dichroic mirrors. The dichroic mirrors serve to split the white light into R, G and B monochromatic lights in accordance with the respective wavelengths. A dichroic mirror formed, for example, as a dielectric multiplayer is coated on a glass surface, and selectively reflects or transmits the light. In other words, according to the property of the coating layer of the dichroic mirror, the monochromatic light is reflected from, or transmitted through the dichroic mirror.

It is further possible that the color separating reflective wheels of the reflective wheel units 232, 234, 236, 238 are provided in multiple numbers of 3, such as six (6), nine (9), and so on. The more color separating reflective wheels of the first to fourth reflective wheel units 232, 234, 236, 238 are provided, the slower that rotation speed of the first to fourth reflective wheel units 232, 234, 236, 238 becomes.

For example, the first to fourth reflective wheel units (not shown), each having six color separating reflective wheels, are rotated in a half velocity of that of the first to fourth reflective wheel units 232, 234, 236, 238, each of three color separating reflective wheels, realizing images of 60 frames per second.

Referring now to FIGS. 4A to 4D, each of the first to fourth reflective wheel units 232, 234, 236, 238 has three color separating reflective wheels 232R to 238B. The three color separating reflective wheels 232R to 238B are coated to a respective thickness according to the properties of the R, G and B monochromatic lights so as to selectively reflect or transmit the respective R, G and B lights.

Accordingly, as the white light reaches any one of the three color separating reflective wheels of the first to fourth reflective wheel units 232, 234, 236, 238, the monochromatic light matching with the property of the coating layer of the color separating reflective wheel is reflected, while the two others not matching with the property of coating layer are transmitted.

Figure 4A:
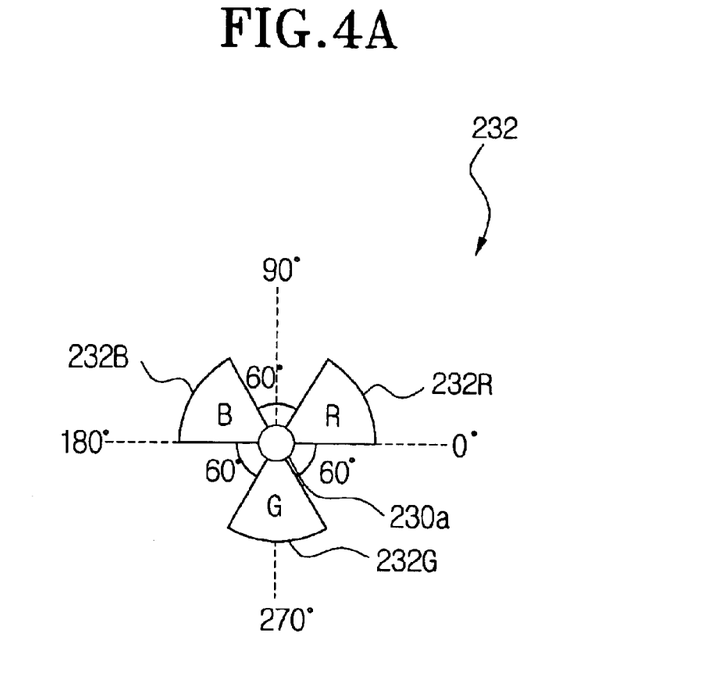
FIGS. 4A to 4D are sectional views of first to fourth reflective wheel units having the dichroic mirror of FIG. 2 therein.

Referring to FIG. 4A, the first reflective wheel unit 232 is provided with first to third color separating reflective wheels 232R, 232G, 232B for selectively reflecting or transmitting the plurality of monochromatic lights of the white light.

The first to third color separating reflective wheels 232R, 232G, 232B are arranged along a circumferential direction of the rotary shaft 230a at equal intervals, and in this embodiment, at 60°. Further, the surfaces of the first to third color separating reflective wheels 232R, 232G, 232B contacting the rotary shaft 230a are positioned at an angle of 60°.

Describing the one example of the above, the first color separating reflective wheel 232R is provided to the rotary shaft 230a in the range of 0° to 60°, with respect to 0°, the second color separating reflective wheel 232G is provided to the rotary shaft 230a in the range of 240° to 300°, and the third color separating reflective wheel 232B is provided to the rotary shaft 230a in the range of 120° to 180°. The first to third color separating reflective wheels 232R, 232G, 232B are provided at equal intervals of 60°.

Further, the first color separating reflective wheel 232R reflects the R monochromatic light of the white light from the condenser lens 220, while transmitting the G and B monochromatic lights. The second color separating reflective wheel 232G reflects the G monochromatic light of the white light from the condenser lens 220, while transmitting the R and B monochromatic lights. The third color separating reflective wheel 232B reflects the B monochromatic light of the white light from the condenser lens 220, while transmitting the R and G monochromatic lights.

Figure 4B:
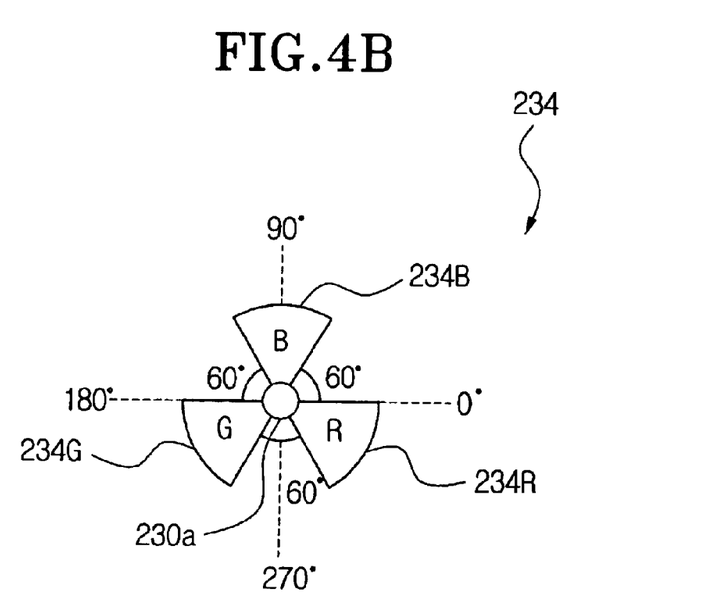

Referring to FIG. 4B, the second reflective wheel unit 234 is provided with fourth to sixth color separating reflective wheels 234R, 234G, 234B for selectively reflecting, or transmitting the plurality of monochromatic lights from the condenser lens 220 which have not transmitted through the first reflective wheel unit 232.

The fourth to sixth color separating reflective wheels 234R, 234G, 234B are arranged along a circumferential direction of the rotary shaft 230a at equal intervals, and in this embodiment, at 60°. Further, the fourth to sixth color separating reflective wheels 234R, 234G, 234B are spaced apart from the first reflective wheel unit 232 by a predetermined distance.

Further, the surfaces of the fourth to sixth color separating reflective wheels 234R, 234G, 234B contacting the rotary shaft 230a are positioned at an angle of 60°. More specifically, the surface of the fourth to sixth color separating reflective wheels 234R, 234B, 234G are disposed in the intervals between the first to third color separating reflective wheels 232R, 232G, 232B.

Describing one example of the above, the fourth color separating reflective wheel 234R is provided to the rotary shaft 230a in the range of 300° to 360° with respect to 0°, the fifth color separating reflective wheel 234G is provided to the rotary shaft 230a in the range of 180° to 240°, and the sixth color separating reflective wheel 234B is provided to the rotary shaft 230a in the range of 60° to 120°. The fourth to sixth color separating reflective wheels 234R, 234G, 234B are provided at equal intervals of 60°.

As the rotary shaft 230a is rotated in the arrowed direction by additional 60°, the fourth to sixth color separating reflective wheels 234R, 234G, 234B are positioned in the places where the first to third color separating reflective wheels 232R, 232G, 232B were before the 60° rotation.

Then, the fourth color separating reflective wheel 234R reflects the R monochromatic light of the white light from the condenser lens 220, while transmitting the G and B monochromatic lights. The fifth color separating reflective wheel 234G reflects the G monochromatic light of the white light from the condenser lens 220, while transmitting the R and B monochromatic lights. The sixth color separating reflective wheel 234B reflects the B monochromatic light from the condenser lens 220, while transmitting the R and G monochromatic lights.

Figure 4C:
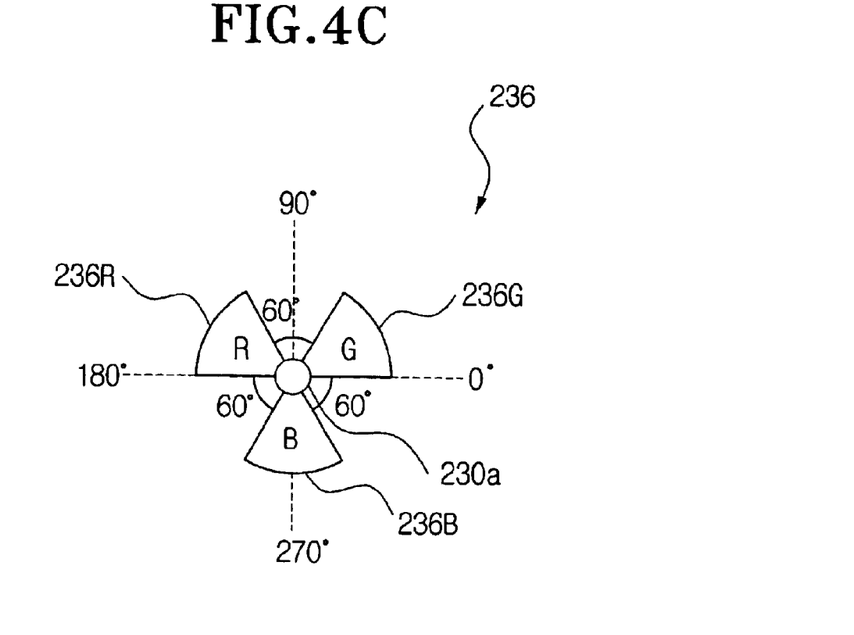

Referring to FIG. 4C, the third reflective wheel unit 236 is provided with seventh to ninth color separating reflective wheels 236G, 236B, 236R arranged on the rotary shaft 230a to face the first reflective wheel unit 232 so as selectively to reflect or to transmit the plurality of incident monochromatic lights that have transmitted through the first reflective wheel unit 232. The seventh to ninth color separating reflective wheels 236G, 236B, 236R are positioned to face the first to third color separating reflective wheels 232R, 232G, 232B, respectively.

The seventh to ninth color separating reflective wheels 236G, 236B, 236R are spaced apart from the second reflective wheel unit 234 in the axial direction of the rotary shaft 230a by a predetermined distance.

Describing one example of the above, the seventh color separating reflective wheel 236G is provided to the rotary shaft 230a in the range of 0° to 60° with respect to 0°, the eighth color separating reflective wheel 236B is provided to the rotary shaft 230a in the range of 240° to 300°, and the ninth color separating reflective wheel 236R is provided to the rotary shaft 230a in the range of 120° to 180°. The seventh to ninth color separating reflective wheels 236G, 236B, 236R are provided at an equal interval of 60°.

Among the G and B monochromatic lights that have transmitted through the first color separating reflective wheel 232R, the seventh color separating reflective wheel 236G reflects the G monochromatic light, while transmitting the B monochromatic light. Among the R and B monochromatic lights that have transmitted through the second color separating reflective wheel 232G, the eighth color separating reflective wheel 236B reflects the B monochromatic light, while transmitting the R monochromatic light. Among the R and G monochromatic lights that have transmitted through the third color separating reflective wheel 232B, the ninth color separating reflective wheel 236R reflects the R monochromatic light, while transmitting the G monochromatic light.

Figure 4D:
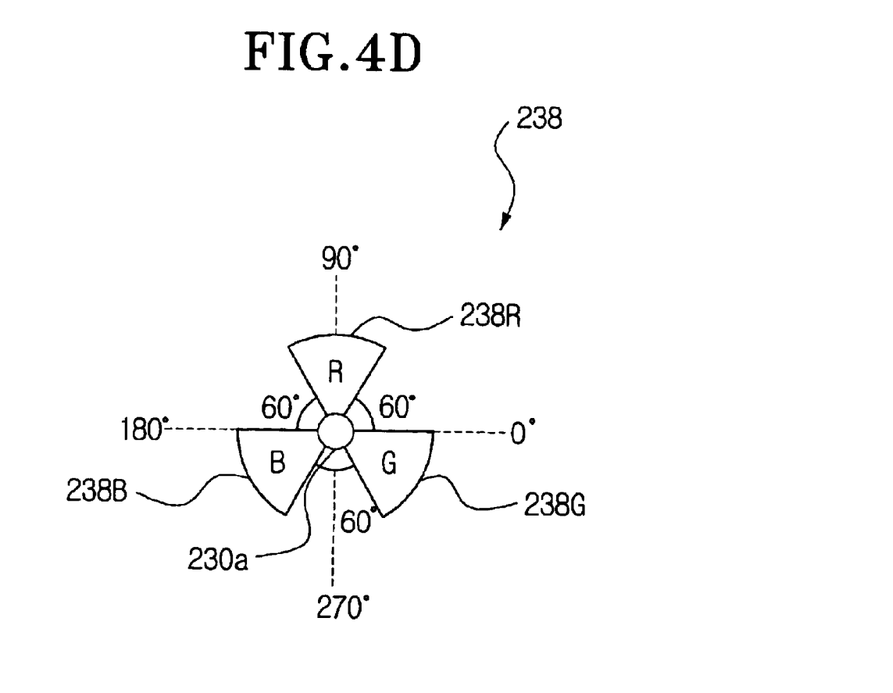

Referring to FIG. 4D, the fourth reflective wheel unit 238 is provided with tenth to twelfth color separating reflective wheels 238G, 238B, 238R for selectively reflecting, or transmitting the plurality of incident monochromatic lights that have transmitted through the second reflective wheel unit 234. The tenth to twelfth color separating reflective wheels 238G, 238B, 238R are arranged on the rotary shaft 230a to face the second reflective wheel unit 234. In other words, the tenth to twelfth color separating reflective wheels 238G, 238B, 238R are positioned to face the fourth to sixth color separating reflective wheels 234R, 234G, 234B, respectively.

The tenth to twelfth color separating reflective wheels 238G, 238B, 238R are arranged in the circumferential direction of the rotary shaft 230a at a predetermined distance in the axial direction from the third reflective wheel unit 236.

Among the G and B monochromatic lights that have transmitted through the fourth color separating reflective wheel 234R, the tenth color separating reflective wheel 238G reflects the G monochromatic light, while transmitting the B monochromatic light. Among the R and B monochromatic lights that have transmitted through the fifth color separating reflective wheel 234G, the eleventh color separating reflective wheel 238B reflects the B monochromatic light, while transmitting the R monochromatic light. Among the R and G monochromatic lights that have transmitted through the sixth color separating reflective wheel 234B, the twelfth color separating reflective wheel 238R reflects the R monochromatic light, while transmitting the G monochromatic light.

Referring back to FIG. 2, the monochromatic lights reflected from the first to twelfth color separating reflective wheels 232R to 238B of the color separating device 230 are incident on the first collimating lens 240.

The first collimating lens 240 concentrates the incident monochromatic light onto the square beam generating unit 250. The square beam generating unit 250 is provided with first to fourth square beam generators 252, 254, 256, 258 corresponding to the first to fourth reflective wheel units 232, 234, 236, 238.

The monochromatic lights reflected from the first and third reflective wheel units 232, 236 are incident on the first and the third square beam generators 252, 256 almost simultaneously, while the monochromatic lights reflected from the second and the fourth reflective wheel units 234, 238 are incident on the second and the fourth square beam generators 254, 258, respectively.

The first to fourth square beam generators 252, 254, 256, 258 may be formed as a light tube that transforms the R, G and B monochromatic lights as incident thereon into square beams. The light tube may be formed as a hollow hexahedron, which has a through hole pierced therein. The interior of the light tube is defined by four sides made of mirrors.

The second collimating lens 260 concentrates the square beams of the two different monochromatic lights incident from the first to fourth square beam generators 252, 254, 256, 258, thereby having the concentrated light incident on the corresponding panel units 270.

The panel unit 270 may be made of digital micromirror device (DMD) panel, or liquid crystal display (LCD) panel. While the DMD panel is reflective, the LCD panel is transmissive.

FIG. 2 shows the structure of the panel unit 270 employing the LCD panels therein. Of course, the structure of the panel unit 270 may vary especially in the arrangement of projecting lens 280 and the screen when the DMD panels are employed instead of LCD panels.

The panel unit 270 is divided into upper, upper-middle, lower-middle and lower panels. The upper and the lower-middle panels of the panel unit 270 will be called hereinbelow as the "first group", while the upper-middle and the lower panels of the panel unit 270 will be called the "second group".

The two different square beams incident from the second collimating lens 260 form two monochromatic color stripes on the two panels of the panel unit 270. In other words, the two monochromatic color stripes are formed on either the first group or the second group. Throughout the drawings, the monochromatic color stripes are represented by hatching, more specifically with the R monochromatic color stripes by oblique lines, G by longitudinal lines, and B by reverse oblique lines.

For example, if the two different square beams from the second collimating lens 260 are the ones that are generated as the lights are reflected from the first and the seventh color separating reflective wheels 232R, 236G, the two square beams form R and G monochromatic color stripes on the first group of the panel unit 270.

In the panel unit 270 formed of DMD panels, the driving mirrors at the DMD panels subject the R, G and B monochromatic color stripes on the respective panels of the panel unit 270 to time-division process, and then reflection at a predetermined angle. The projecting lens 280 is faced with the panel unit 270, and enlarges the monochromatic color stripes from the panel unit 270 and projects such enlarged stripes onto a screen. As a result, an image is realized on the screen.

A single image consisting of R, G and B monochromatic lights being combined with each other, is realized as the R, G and B monochromatic color stripes are incident on the first and the second groups of the panel unit 270 by predetermined order at least once.

FIGS. 5A to 5F are views illustrating a process of realizing a single image on the panel unit according to the preferred embodiment of the present invention of FIG. 2.

Figure 5A:
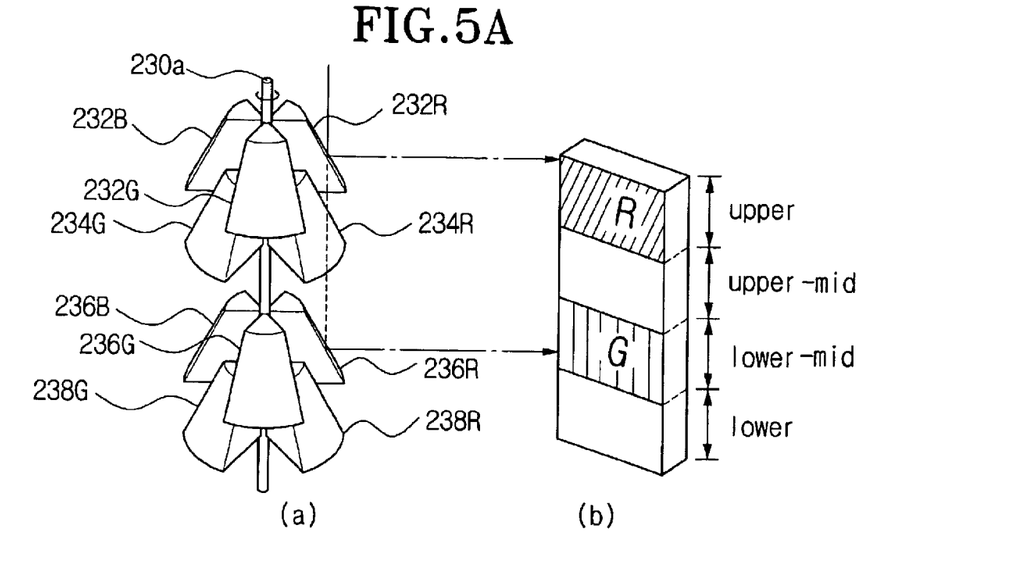
FIGS. 5A to 5F are views for illustrating a method for realizing one image on the panel unit of FIG. 2.
Figure 5B:
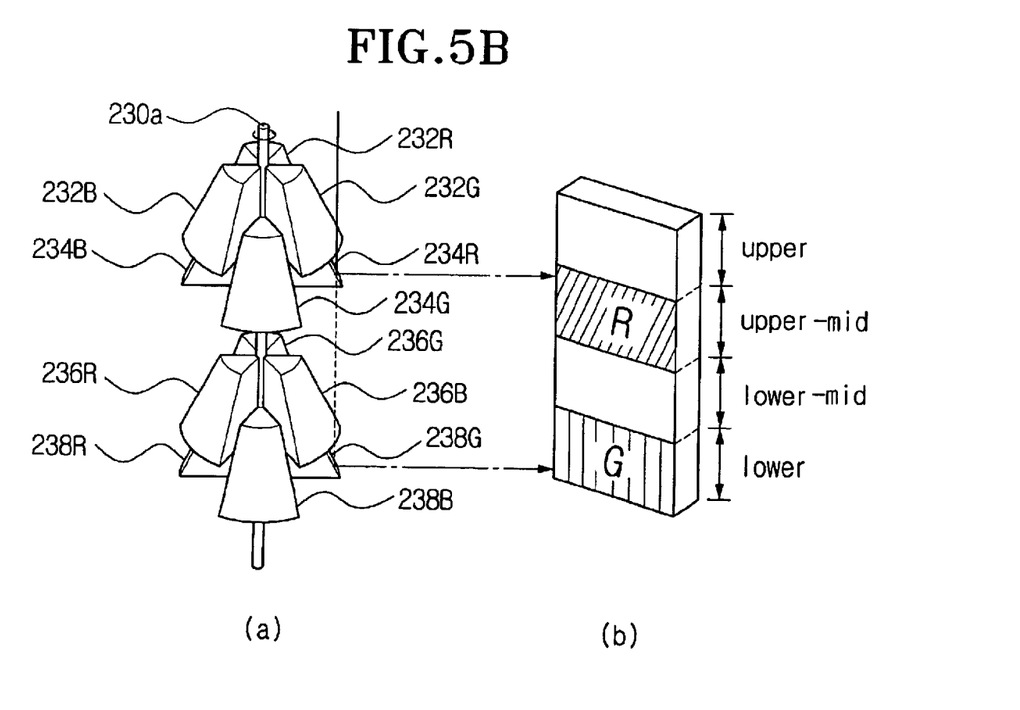
Figure 5C:
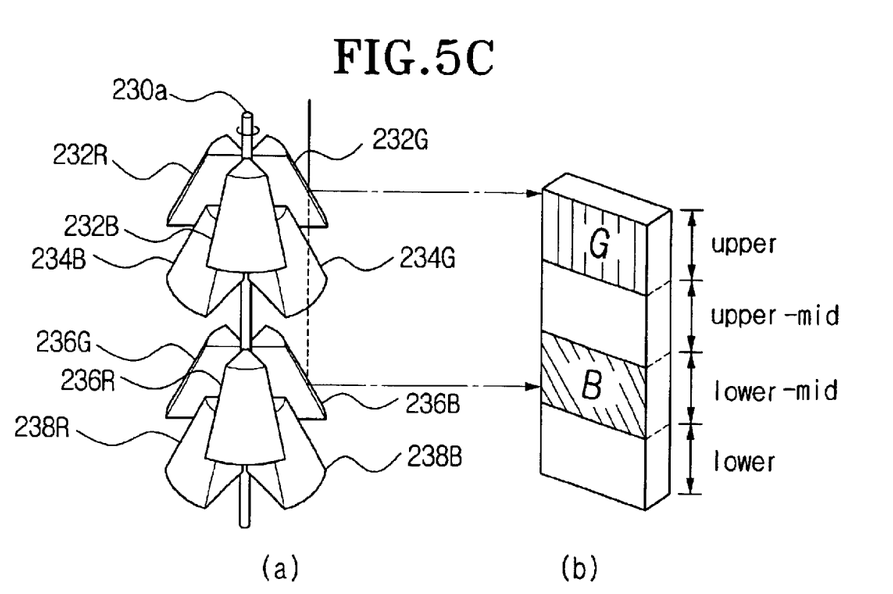
Figure 5D:
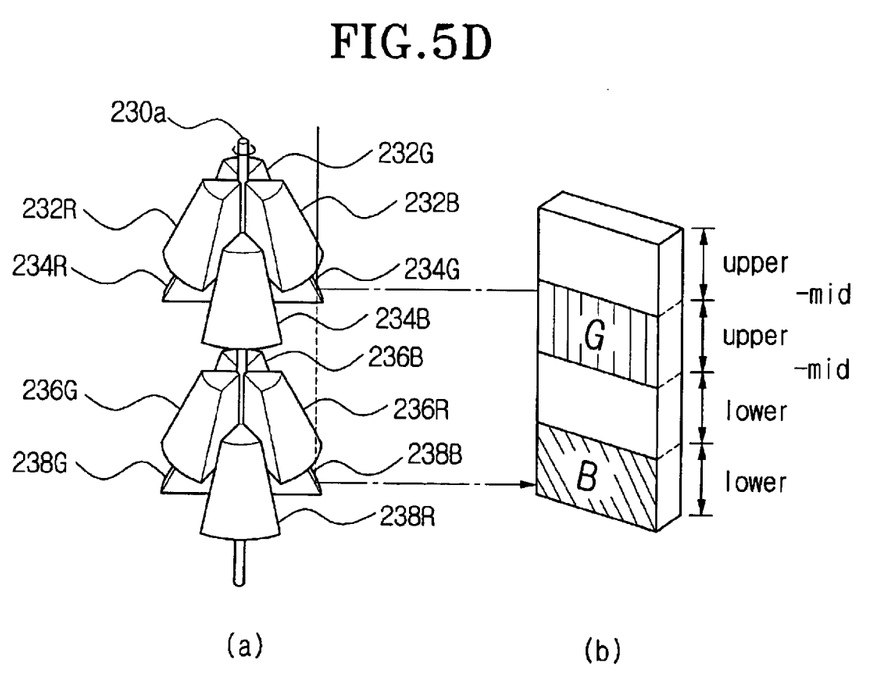
Figure 5E:
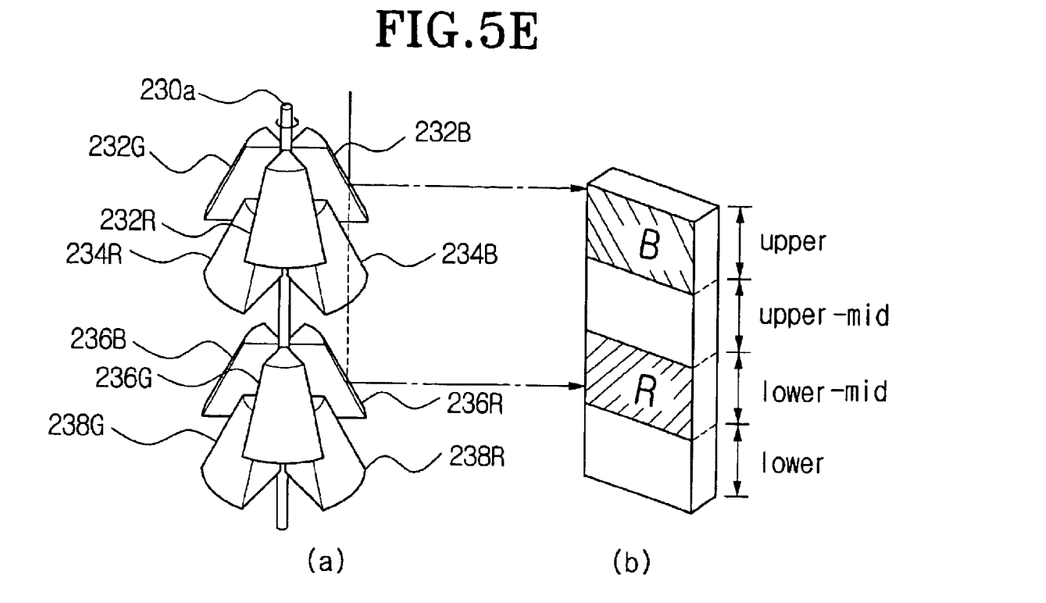
Figure 5F:
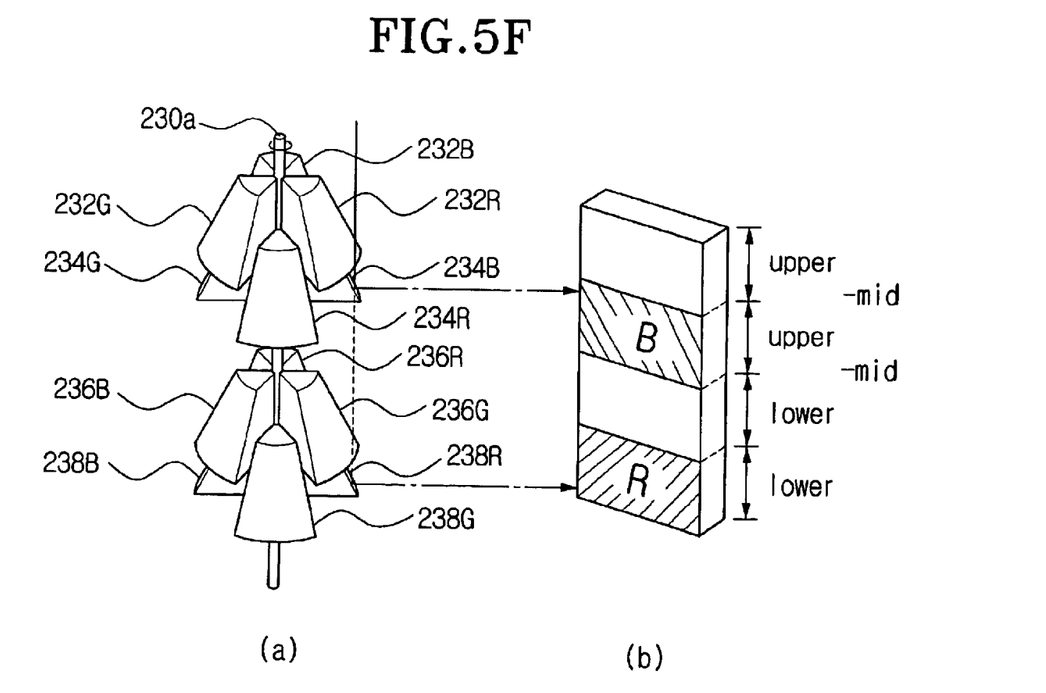

Having the position of the color separating device 230 of FIG. 5A as a reference, FIG. 5B shows the color separating device 230 rotated about the rotary shaft 230a in the arrowed direction by 60°, FIG. 5C by 120°, FIG. 5D by 180°, FIG. 5E by 240°, and FIG. 5F by 300°.

As the color separating device 230 is rotated as shown in FIGS. 5A to 5F, i.e., as the color separating device 230 is rotated once, R, G and B monochromatic color stripes are formed on the first and the second groups of the panel unit 270 at least once, thereby forming a single image thereon.

Referring to FIG. 5A, among the R, G and B monochromatic lights from the condenser lens 220, the R monochromatic light is reflected from the first color separating reflective wheel 232R, while the G and B monochromatic lights are transmitted. After transmitting through the first color separating reflective wheel 232R, the G monochromatic light is reflected from the seventh color separating reflective wheel 236G, while the B monochromatic light is transmitted.

And almost simultaneously, the R monochromatic light reflected from the first color separating reflective wheel 232R and the G monochromatic light reflected from the seventh color separating reflective wheel 236G are incident on the first and the third square beam generators 252, 256, respectively. Then the R and G square beams generated at the first and the third square beam generators 252, 256 are incident on the panel unit 270 at the right side (b) of FIG. 5A, forming R and G monochromatic color stripes on the first group.

Referring to FIG. 5B, as the rotary shaft 230a at the left side (a) of FIG. 5A is further rotated to 60°, R monochromatic light of the white light from the condenser lens 220 is reflected from the fourth color separating reflective wheel 234R, while the G and B monochromatic lights are transmitted. Then the G monochromatic light is reflected from the tenth color separating reflective wheel 238G of the fourth reflective wheel unit 238, while the B monochromatic light is transmitted.

And almost simultaneously, the R monochromatic light reflected from the fourth color separating reflective wheel 234R and the G monochromatic light reflected from the tenth color separating reflective wheel 238G are incident on the second and the fourth square beam generators 254, 258. Then the R and G square beams generated at the second and the fourth square beam generators 254, 258 are incident on the second group of the panel unit 270 at the right side (b) of FIG. 5B, thereby forming R and G monochromatic color stripes on the second group.

Referring to FIG. 5C, as the rotary shaft 230a at the left side (a) of FIG. 5A is further rotated to 120°, G monochromatic light of the white light from the condenser lens 220 is reflected from the second color separating reflective wheel 232G, while the R and B monochromatic lights are transmitted. After transmitting through the second color separating reflective wheel 232G, the B monochromatic light is reflected from the eight color separating reflective wheel 236B of the third reflective wheel unit 236, while the R monochromatic light is transmitted.

And almost simultaneously, the G monochromatic light reflected from the second color separating reflective wheel 232G and the B monochromatic light reflected from the eighth color separating reflective wheel 236B are incident on the first and the third square beam generators 252, 256. Then the G and B square beams generated at the first and the third square beam generators 252, 256 are incident on the first group of the panel unit 270 at the right side (b) of FIG. 5C, thereby forming G and B monochromatic color stripes on the first group.

Referring to FIG. 5D, as the rotary shaft 230a at the left side (a) of FIG. 5A is further rotated to 180°, the G monochromatic light of the white light from the condenser lens 220 is reflected from the fifth color separating reflective wheel 234G, while R and B monochromatic lights are transmitted. After transmitting through the fifth color separating reflective wheel 234G, the B monochromatic light is reflected from the eleventh color separating reflective wheel 238B of the fourth reflective wheel unit 238, while the R monochromatic light is transmitted.

And almost simultaneously, the G monochromatic light reflected from the fifth color separating reflective wheel 234G and the B monochromatic light reflected from the eleventh color separating reflective wheel 238B are incident on the second and the fourth square beam generators 254, 258. Then the G and B square beams generated at the second and the fourth square beam generators 254, 258 are incident on the second group of the panel unit 270 at the right side (b) of FIG. 5D, thereby forming G and B monochromatic color stripes on the second group.

Referring to FIG. 5E, as the rotary shaft 230a at the side (a) of FIG. 5A is further rotated to 240°, the B monochromatic light of the white light from the condenser lens 220 is reflected from the third color separating reflective wheel 232B, while the R and G monochromatic lights are transmitted. After transmitting through the third color separating reflective wheel 232B, the R monochromatic light is reflected from the ninth color separating reflective wheel 236R, while the G monochromatic light is transmitted.

And almost simultaneously, the G monochromatic light reflected from the third color separating reflective wheel 232B and the R monochromatic light reflected from the ninth color separating reflective wheel 236R are incident on the first and the third square beam generators 252, 256. Then the B and R square beams generated at the first and the third square beam generators 252, 256 are incident on the first group of the panel unit 270, thereby forming B and R monochromatic color stripes on the first group.

Referring to FIG. 5F, as the rotary shaft 230a at the side (a) of FIG. 5A is further rotated to 300°, the B monochromatic light of the white light from the condenser lens 240 is reflected from the sixth color separating reflective wheel 234B, while the R and G monochromatic lights are transmitted. After transmitting through the sixth color separating reflective wheel 234B, the R monochromatic light is reflected from the twelfth color separating reflective wheel 238R of the fourth reflective wheel unit 238, while the G monochromatic light is transmitted.

And almost simultaneously, the B monochromatic light reflected from the sixth color separating reflective wheel 234B and the R monochromatic light reflected from the twelfth color separating reflective wheel 238R are incident on the second and the fourth square beam generators 254, 258. Then the B and R square beams generated at the second and the fourth square beam generators 254, 258 are incident on the second group of the panel unit 270, thereby foaming the B and R monochromatic color stripes on the second group.

Figure 6:
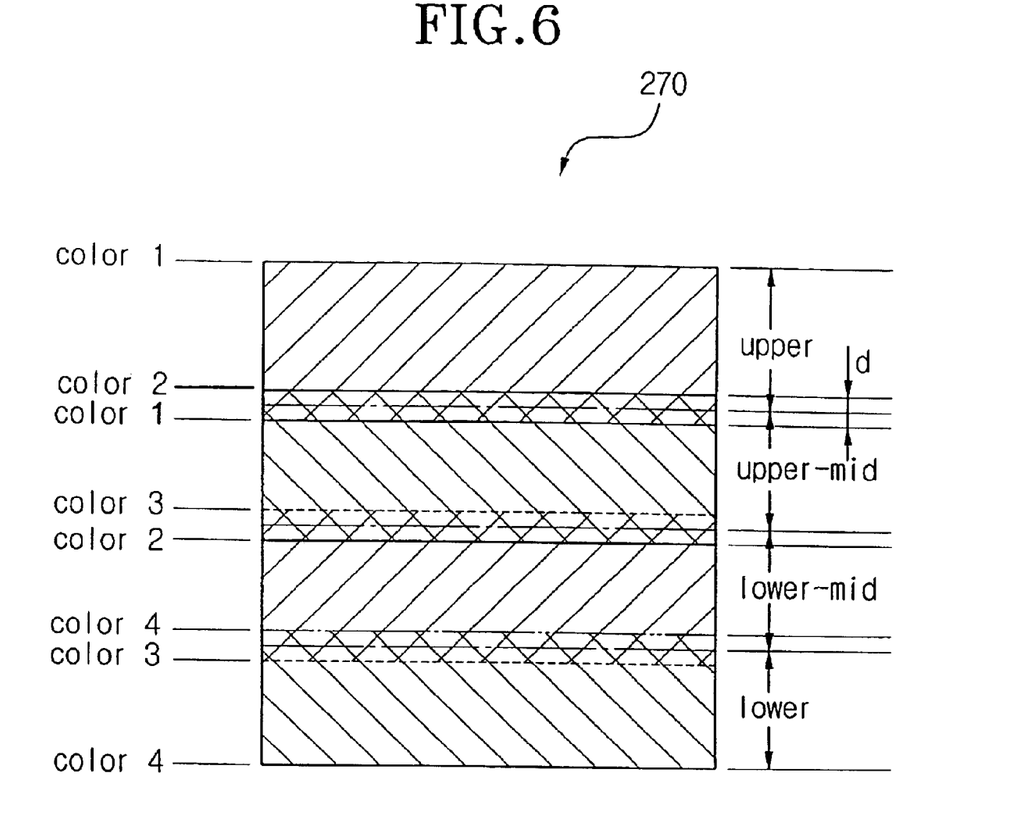
FIG. 6 is a view for illustrating a method for realizing monochromatic color stripes on the panel unit after transmitting through the color separating device of FIG. 2.

FIG. 6 is a view illustrating a process of forming a monochromatic color stripe on the panel unit by the color separating device of FIG. 2.

Referring to FIG. 6, there is provided a panel unit 270 divided into upper, upper-middle, lower-middle and lower panels. There are formed on the upper and the lower-middle panels of the panel unit 270 the first monochromatic color stripe (color 1) and the third monochromatic color stripe (color 3) of the monochromatic lights reflected from the first and the third reflective wheel units 232, 236 of the color separating device 230. The first and the third monochromatic color stripes (color 1, color 3) are represented by hatching in FIG. 6 in oblique lines.

There are formed on the upper-middle and the lower panels of the panel unit 270 the second monochromatic color stripe (color 2) and the fourth monochromatic color stripe (color 4) of the monochromatic lights reflected from the second and the fourth reflective wheel units 234, 238 of the color separating device 230. The second and the fourth monochromatic color stripes (color 2, color 4) are represented by hatching in reverse oblique lines.

The places where the oblique lines and the reverse oblique lines meet are where the second monochromatic color stripe (color 2), which is formed on the panel unit 270 after the first monochromatic color stripe (color 1) at a predetermined time interval, partially overlaps the first monochromatic color stripe (color 1). In other words, after the formation of the first monochromatic color stripe (color 1) on the panel unit 270, the second monochromatic color stripe (color 2) is projected onto the panel unit 270 overlapping the lower end of the first monochromatic color stripe (color 1) for a distance as much as 'd'.

In actuality, however, there is no overlapping area of the monochromatic color stripes because the monochromatic color stripes are projected onto the first and the second groups at predetermined time intervals. In other words, while the color stripes may be overlapped with each other in a spatial sense, they are not overlapped with each other in a temporal sense. As a result, smoother images are guaranteed.

In addition, instead of four reflective wheel units 232, 234, 236, 238, the image projecting apparatus 200 according to the present invention may be provided with six reflective wheel units, and accordingly, six panels for the panel unit 270. In the case of using six reflective wheel units, the monochromatic light that has transmitted through the fourth reflective wheel unit 238 is reflected from the other reflective wheel units, then following a predetermined optic path, incident on a predetermined area of the panel unit 270 forming a monochromatic color stripe thereon. Since the loss of light is reduced, light utilization is improved.

According to the present invention, the color separating device 230 has the third reflective wheel unit 236 in the position of the rotary shaft 230a where the second reflective wheel unit 234 is provided, with the first reflective wheel unit 232 facing the third reflective wheel unit 236. Also, the color separating device 230 has the second reflective wheel unit 234 in the position of the rotary shaft 230a where the third reflective wheel unit 236 is provided, with the second reflective wheel unit 234 facing the fourth reflective wheel unit 238. The second reflective wheel unit 234 may be spaced apart from the first reflective wheel unit 232 in the axial direction by a predetermined distance.

Although the reflective wheels of the color separating device 230 are depicted in FIG. 2 as being arranged horizontally with respect to the panel 270 and the screen, the reflecting wheels may be oriented in other ways, including vertically. For example, reflective wheel 232 may be arranged such that the "upper" portion of the panel 270 may instead be generated vertically on the panel 270, thereby illuminating a portion of the screen disposed vertically on the screen. The orientation of the reflective wheels would depend on the dimensions and desired orientation of the screen.

As described above, the image projecting apparatus according to the present invention uses a plurality of dichroic mirrors to form at least two monochromatic color stripes on the panel unit simultaneously and at a predetermined interval. Accordingly, simultaneous overlapping of the monochromatic color stripes can be prevented. Further, by using the plurality of dichroic mirrors that selectively reflect or transmit the incident lights of the white light in accordance with the respective wavelengths, the monochromatic color stripes are realized on the panel unit in certain order, and as a result, light utilization is improved.

Although some preferred embodiments of the present invention have been described, it will be understood by those skilled in the art that the present invention should not be limited to the described preferred embodiments, but various changes and modifications can be made within the spirit and scope of the present invention as defined by the appended claims.

What is claimed is:

1. A color separating device configured to separate a light emitted from a light source into a plurality of monochromatic lights of different wavelengths, comprising:

a first reflective wheel unit comprising a plurality of color separating reflective wheels, the plurality of color separating reflective wheels arranged with respect to a rotary shaft in a circumferential direction at equal intervals and configured so as selectively to reflect or to transmit incident lights of the light from the light source;

a second reflective wheel unit comprising a plurality of color separating reflective wheels, the plurality of color separating reflective wheels arranged with respect to the rotary shaft in the circumferential direction at equal intervals and configured so as selectively to reflect or to transmit incident lights of the light from the light source which are not transmitted through the first reflective wheel unit, the plurality of color separating reflective wheels being at a predetermined distance from the first reflective wheel unit in an axial direction of the rotary shaft;

a third reflective wheel unit comprising a plurality of color separating reflective wheels, the plurality of color separating reflective wheels arranged with respect to the rotary shaft in the circumferential direction at equal intervals, facing the color separating reflective wheels of the first reflective wheel unit, and configured so as selectively to reflect or to transmit incident lights of the light which is transmitted through the first reflective wheel unit, the plurality of color separating reflective wheels being at a predetermined distance from the second reflective wheel unit in the axial direction of the rotary shaft; and a fourth reflective wheel unit comprising a plurality of color separating reflective wheels, the plurality of color separating reflective wheels arranged with respect to the rotary shaft in the circumferential direction at equal intervals, facing the color separating reflective wheels of the second reflective wheel unit, and configured so as selectively to reflect or to transmit incident lights of the light which is transmitted through the second reflective wheel unit, the plurality of color separating reflective wheels being at a predetermined distance from the third reflective wheel unit in the axial direction of the rotary shaft.

2. The color separating device of claim 1, wherein the color separating reflective wheels of the first to fourth reflective wheel units are arranged at a predetermined slope with respect to the rotary shaft.

3. The color separating device of claim 1, wherein the color separating reflective wheels of the first to fourth reflective wheel units are arranged with respect to the rotary shaft in the circumferential direction at intervals of 60°.

4. An image projecting apparatus having a color separating device configured to separate a light emitted from a light source into a plurality of monochromatic lights of different wavelengths, and a panel unit configured to receive an input of the monochromatic lights reflected from the color separating device so as to form on the panel unit corresponding monochromatic color stripes, the color separating device comprising:

a first reflective wheel unit comprising a plurality of color separating reflective wheels, the plurality of color separating reflective wheels arranged with respect to a rotary shaft in a circumferential direction at equal intervals and configured so as selectively to reflect or to transmit incident lights of the light from the light source;

a second reflective wheel unit comprising a plurality of color separating reflective wheels, the plurality of color separating reflective wheels arranged with respect to the rotary shaft in a circumferential direction at equal intervals and configured so as selectively to reflect or to transmit incident lights of the light from the light source which are not transmitted through the first reflective wheel unit, the plurality of color separating reflective wheels being at a predetermined distance from the first reflective wheel unit in an axial direction of the rotary shaft;

a third reflective wheel unit comprising a plurality of color separating reflective wheels, the plurality of color separating reflective wheels arranged in the circumferential direction of the rotary shaft at equal intervals, facing the plurality of color separating reflective wheels of the first reflective wheel unit, and configured so as selectively to reflect or to transmit incident lights of the light which is transmitted through the first reflective wheel unit, the plurality of color separating reflective wheels being at a predetermined distance from the second reflective wheel unit in the axial direction of the rotary shaft; and a fourth reflective wheel unit comprising a plurality of color separating reflective wheels, the plurality of color separating reflective wheels arranged in the circumferential direction of the rotary shaft at equal intervals, facing the plurality of color separating reflective wheels of the second reflective wheel unit, and configured so as selectively to reflect or to transmit incident lights of the light which is transmitted through the second reflective wheel unit, the plurality of color separating reflective wheels being at a predetermined distance from the third reflective wheel unit in the axial direction of the rotary shaft.

5. The image projecting apparatus of claim 4, wherein the color separating reflective wheels of the first to fourth reflective wheel units are arranged at a predetermined slope with respect to the rotary shaft.

6. The image projecting apparatus of claim 4, wherein the color separating reflective wheels of the first to fourth reflective wheel units are arranged with respect to the rotary shaft in the circumferential direction at intervals of 60°.

7. The image projecting apparatus of claim 4, further comprising a condenser lens for concentrating the light emitted from the light source onto the color separating reflective wheels of the color separating device.

8. The image projecting apparatus of claim 4, further comprising:

a first collimating lens configured to direct monochromatic light of the plurality of monochromatic lights of different wavelengths reflected from the color separating reflective wheels of the color separating device so as to be incident on one of a plurality of square beam generating units;

the one of the plurality of square beam generating units configured to transform the monochromatic light of the plurality of monochromatic lights of different wavelengths from the first collimating lens into a square beam, and then to emit the square beam; and a second collimating lens configured to direct the square beam from the one of the plurality of square beam generating units onto a corresponding position of the panel unit.

9. The image projecting apparatus of claim 4, further comprising a projecting lens configured to enlarge the monochromatic color stripes from the panel unit, and then to project the enlarged monochromatic color stripes onto a screen.

* * * * *